United States Patent Office 2,823,220
Patented Feb. 11, 1958

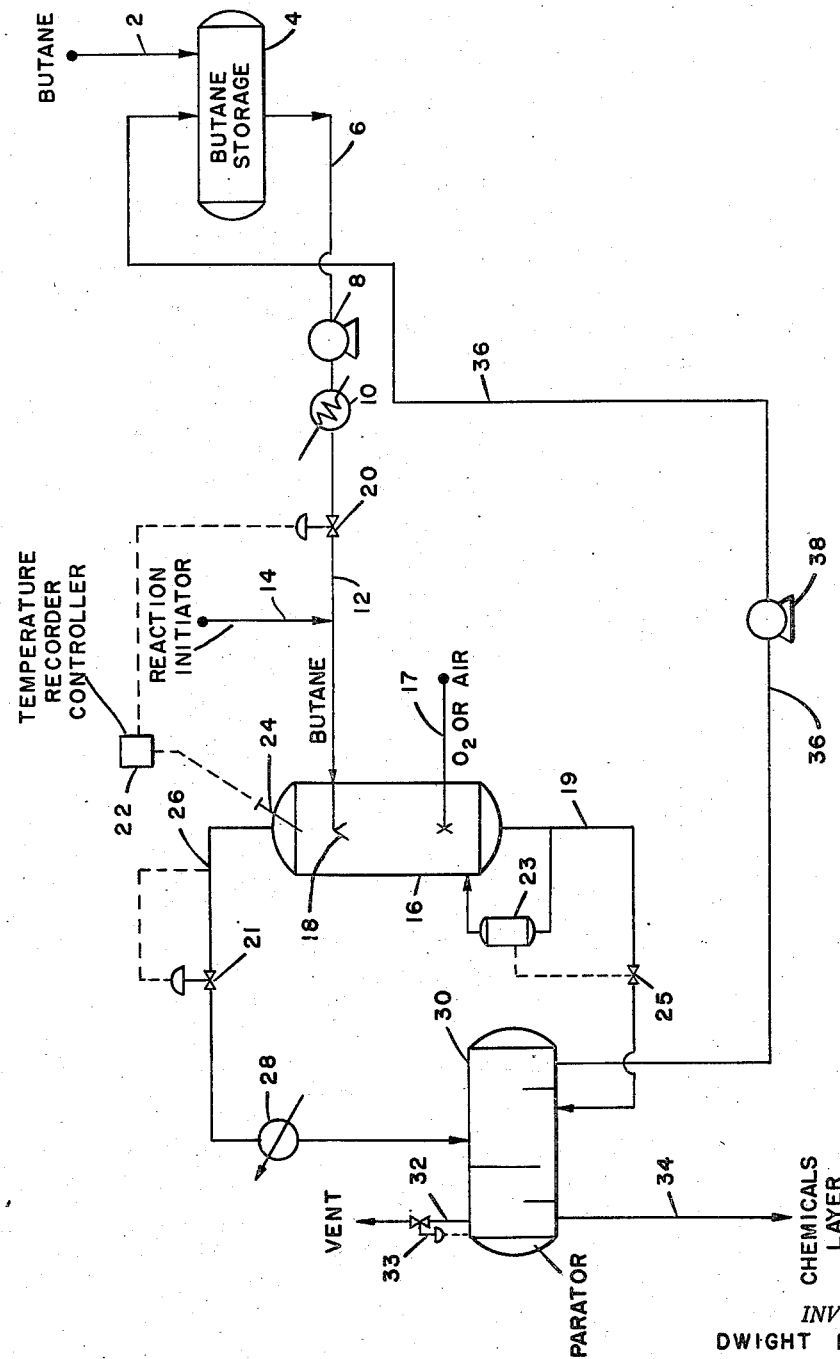

2,823,220

METHOD FOR CONDUCTING GAS-LIQUID-PHASE REACTIONS

Dwight B. Mapes, Tulsa, Okla., assignor to Pan American Petroleum Corporation, a corporation of Delaware Application July 7, 1955, Serial No. 520,480

6 Claims. (Cl. 260—451)

The present invention relates to a novel procedure for conducting chemical reactions wherein one of the reactants is entirely in the gas or vapor phase and the other reacting component is in the liquid phase. More particularly, it is concerned with a method for conducting reactions under conditions such that the advantages of both vapor- and liquid-phase operations are provided while, at the same time, minimizing the disadvantages of each of said operations.

While the principles of my invention are applicable to a wide variety of reactions of the type generally defined above, in which the reaction is exothermic, the present description illustrates the suitability thereof to the partial oxidation of hydrocarbons. Reactions of this type may be carried out with the hydrocarbon either in vapor phase or liquid phase. In vapor-phase operations, the rate of reaction is rapid and temperature control frequently becomes a problem. The latter is particularly true in the vapor-phase oxidation of hydrocarbons where it is known that the selectivity to more desirable products decreases with increasing temperature. In the case of the gas-liquid-phase partial oxidation of hydrocarbons, the reaction rate is much slower than for vapor-phase operation and the distribution of products is quite different. For example, the product mixture from the vapor-phase partial oxidation of butane contains about 15 mol percent acids and esters, mainly acetic acid; about 30 mol percent alcohols, principally methanol; and about 55 mol percent of carbonyls, about 50 percent of which is formaldehyde. In the product mixture obtained by the gas-liquid-phase procedure, 55 percent of the total product is acids, of which acetic acid represents about 90 percent; and 22 mol percent alcohols, of which about 30 percent is methanol, about 50 percent being ethanol, and about 15 percent being isopropyl alcohol. Carbonyls comprise about 15 mol percent of the product mixture with formaldehyde amounting usually to less than 1 percent. Esters make up the remainder of the mixture, generally amounting to about 8 or 10 mol percent.

By the process of my invention I am able to achieve accurate control of the reaction temperature. I am also able to produce, in the case of partial oxidation of hydrocarbons, the more desirable products characteristic of gas-liquid-phase reaction at reaction rates typical of vapor-phase reaction.

In carrying out the process of my invention, the desired reaction temperature should be above the normal boiling point of the liquid employed and below its critical temperature. The pressure employed can then be adjusted so that the reaction liquid will boil at the reaction temperature desired. Under such conditions, the liquid, for example, butane, may be sprayed into the reaction zone in the form of a mist at the desired reaction temperature and the pressure so adjusted that only a small proportion of the butane vaporizes at that temperature and a condition of equilibrium exists between butane liquid droplets and butane vapor. The simultaneous admission of oxygen at the same temperature allows a thorough mixing of butane mist with the oxygen with the resultant oxidation of a portion of the butane. Heat liberated by the portion of the liquid butane which reacts causes some of the unreacted hydrocarbon to vaporize, thereby absorbing the heat of reaction and preventing appreciable temperature rise. Since temperature control is dependent upon evaporation of butane, there should always be an excess of unreacted butane present in the reaction zone. Thus, a tendency for the temperature of the reaction zone to rise above the equilibrium temperature would indicate a depletion of the liquid butane phase and this could immediately be offset by an increase in the ratio of butane to oxygen fed to the reaction zone. The equilibrium temperature can also be lowered or raised by decreasing or increasing the pressure of the system.

In a preferred embodiment of my invention, the butane feed containing the catalyst should be started to the reactor prior to introduction of the oxygen. The pressure on the reactor should be adjusted so that preferably about 10 to 20 percent of the butane vaporizes when it is sprayed into the reactor and 80 to 90 percent remains in the liquid form and flows out the bottom. When the preheated oxygen is admitted, reaction takes place with both liquid droplets of butane and butane vapor, but heat of reaction causes butane from the droplets to vaporize and thus cool the reaction zone, holding the temperature constant as long as any liquid butane droplets remain in the reaction zone.

To be sure that the temperature is being controlled by the vaporization of butane, at least 5 to 15 percent of the butane should remain in the liquid phase and be drawn out of the bottom of the reactor with the liquid products. The pressure and the ratio of butane to oxygen feed may be varied to control the reaction temperature at any predetermined temperature provided the preheat temperature is sufficiently high to initiate the reaction when the oxygen contacts the butane.

The temperatures and pressures employed in carrying out the process of my invention will, of course, vary widely; however, as previously mentioned, for any given liquid the temperature and pressure should be such that the liquid and its vapors are in equilibrium. Actually, while I have indicated that the desired temperature should lie between the boiling point of the liquid and its critical temperature, it is desirable that the reaction be carried out far enough below the critical temperature that the latent heat of vaporization is adequate to offset the heat of reaction. If operation at or above the critical temperature is considered necessary, a suitable liquid having a relatively high latent heat of vaporization, such as for example, water, may be sprayed into the reaction zone to produce the required cooling. In this event, the pressure of the system should be adjusted to the equilibrium pressure of the liquid and its vapor under the conditions existing in the reactor. This expedient may, of course, be extended to ordinary gas-phase reactions when none of the reactants involved can be maintained in this liquid phase at the reaction temperature. In reactions of this type, water at its boiling point is introduced into the reaction zone which is held at a temperature and pressure such that the liquid water is in equilibrium with its vapors. As the gas-phase reaction occurs, the heat liberated in the system is absorbed, so to speak, by the evaporation of an amount of water corresponding substantially to the quantity of heat liberated by the reaction. Thus, it may be seen that reactions such as the partial oxidation of butane, propane or ethane, and the like, may be effected in the vapor phase, it still being possible to maintain the temperature of the reaction zone within a sufficiently low range to favor the formation of more desirable products than are produced under conventional vapor-phase operating conditions.

In general, however, it is preferred to operate at temperatures substantially lower than the critical temperature of the reacting liquid, if the reaction permits, because as the critical temperature is approached, the latent heat of vaporization of the liquid becomes less, hence, rendering less effective the evaporative cooling effect. Thus, in the case of butane having a critical temperature of about 153° C., the reaction temperature generally should not exceed about 150° C., but may be as low as about 130° C., or lower. At 130° C., the vapor pressure of butane is about 450 p. s. i. and at 150° C., its vapor pressure is about 485 p. s. i. Corresponding information on numerous other hydrocarbons, as well as other liquids which may be subjected to reaction in accordance with the process of my invention, can be secured from any of a number of standard reference works in order to determine the conditions of temperature and pressure required to maintain any given reacting liquid and its vapor in equilibrium. In general, it may be said that the reaction temperature employed for a given reaction carried out in accordance with my invention may correspond to temperatures used for the same reaction effected under previously known gas-liquid-phase conditions. Owing to the fact that the process of my invention provides for reacting the gas with a liquid which is in an extremely fine state of division, it is frequently possible to effect the reaction at temperatures below those normally required by the conventional method of conducting such reaction.

In carrying out my invention, the liquid reactant should be in molar excess over the gaseous reactant. Otherwise stated, the liquid and gaseous reactants should generally be at least in substantially the same proportions as may be employed in the conventional vapor-phase reaction wherein the feed thereto contains an excess of the higher boiling component. In the case of the partial oxidation of light hydrocarbons, such as for example, propane or butane, the oxygen should be present in an amount ranging from 5 to as much as about 45 or 50 mol percent at atmospheric pressure. In ordinary vapor-phase operation, the amount of oxygen that the system can tolerate decreases with increasing pressure. Accordingly, for the pressures required by the process of my invention, in the case of butane, I generally prefer to operate at an oxygen concentration of from about 10 to about 30 mol percent.

As examples of reactions which may be effected using the principles of my invention, there may be mentioned, in addition to the partial oxidation of suitable aliphatic and aromatic hydrocarbons, the nitration or chlorination of aliphatic or aromatic hydrocarbons. In carrying out procedures such as those described immediately above, some of them generally require catalysts. Any catalyst known to be satifsactory in liquid-phase operation for any given reaction may be employed. Thus, in the gas-liquid-phase partial oxidation of aliphatic hydrocarbons, cobalt tetraacetate in the desired concentrations may be added to the hydrocarbon feed or to the oxygen prior to reaction. In the nitration of hydrocarbons, in accordance with my invention, a suitable catalyst, such as elemental sulfur, may be dissolved in the hydrocarbon prior to reaction with nitric oxide or vaporous nitric acid.

For a better understanding of my invention, reference is made to the accompanying flow diagram wherein the liquid component to be reacted, for example butane, is fed to the system through line 2. The butane is transferred through line 2 into storage tank 4 from which it is withdrawn at a controlled rate. The butane is transferred through line 6 and pump 8 and heated in exchanger 10 to a temperature of, for example, from 120° to 150° C. A suitable catalyst, such as cobalt tetraacetate dissolved in aqueous acetic acid, is added to the hot liquid butane in line 12 through line 14 and thereafter the butane containing catalyst is introduced into reactor 16 in the form of a spray or mist through nozzles 18 where it contacts oxygen added at the lower part of the reactor through line 17. The flow of butane through line 12 is accurately regulated by control valve 20 operated by temperature recorder controller 22, which, in turn, is activated by thermocouple 24. The equilibrium temperature maintained by the evaporation of butane is controlled by valve 21. If it is found that the reaction is proceeding at a rate which is either too fast or too slow, the equilibrium pressure and the resultant temperature of the reaction zone can be adjusted accordingly by the setting of pressure control valve 21.

Some unconverted butane, together with normally gaseous reaction products, are taken overhead from the reactor through line 26 and cooled in condenser 28, after which the overhead components are transferred to separator 30. The gaseous reaction products are taken off through line 32 and vented through pressure relief valve 33, or used to supplement plant fuel, if desired. Liquid products, together with liquid butane, accumulate at the base of reactor 16 and are periodically removed therefrom through line 19 and sent to separator 30. The level of liquid (butane, plus oxidation products) in the lower part of the reactor is kept substantially constant by a liquid level control system comprising a float-actuated valve 25 and a receiver 23 for said butane and oxidation products. The liquid components stratify into two layers in separator 30 consisting chiefly of unconverted butane, together with a small amount of product chemicals dissolved therein. The lower aqueous layer contains from about 50 to 65 percent chemicals, with the balance being water of reaction. This lower aqueous layer of chemicals is withdrawn from the system through line 34 and sent to further separation and refining. The organic or butane layer is withdrawn through line 36 and returned by means of pump 38 to butane storage tank 4. As the process proceeds, the concentration of dissolved chemicals in the butane builds up to a sufficient level that these chemicals may be used as a catalyst for the reaction instead of the extraneous addition of a reaction initiator to the system through line 14.

The process of my invention will be further illustrated by the following example:

*Example*

Butane, preheated to about 140° C., is fed at the rate of about 2 mols per hour to a reaction zone maintained at a temperature of about 140° C. and at a pressure of about 500 p. s. i. Prior to the entry of butane into the reaction zone, a solution of catalyst consisting of 2.7 weight percent of cobalt tetraacetate, 77 weight percent acetic acid and 20.3 weight percent water, is added to and mixed with the butane stream at a rate of about 11.1 grams per hour. At the lower part of the reaction zone, oxygen is fed at the rate of about 1.7 mols per hour. Reaction occurs immediately on contact of oxygen with the butane which is present in the reaction zone chiefly in the form of a mist. The initial tendency of the reaction temperature to rise above 140° C. at the pressure employed in the reactor is controlled by a thermocouple placed near the outlet of the reactor operating a temperature control device which, in turn, regulates the flow of liquid butane to the reaction zone. Upon allowing the opening in this valve to increase, sufficient butane is admitted to the reactor to maintain equilibrium between liquid and vapor, thereby preventing further temperature rise. During the run, a small pool of liquid butane, together with reaction products, is maintained at the bottom of the reaction zone by means of a suitable liquid level control device. The pressure employed corresponds to the vapor pressure of liquid in the reactor at 140° C., thus making it possible for the vaporized butane and the liquid butane, i. e., droplets being introduced plus that at the bottom of the reaction zone, to remain in equilibrium.

Unconverted gaseous butane, together with gaseous reaction products, flows out of the top of the vapor takeoff line and is condensed at a temperature of about 25° to 35° C., after which the resulting condensate flows into a separator containing the reaction products. Uncondensable gases are vented through a pressure relief valve at the top of the separator and the reaction products are removed in the form of a lower aqueous layer. The upper liquid layer of butane contains some oxidation products which may be removed therefrom by water-washing. Thereafter, the butane is recycled to the feed line.

Under the above indicated conditions of operation, liquid products, including water, are cooled at the rate of about 58 grams per hour. Of this liquid product fraction, about 20 weight percent is water. The distribution of chemicals by classes is as follows:

| | Mol percent |
|---|---|
| Acids | 68 |
| Alcohols | 10 |
| Carbonyls | 14 |
| Esters | 8 |

The oxygen conversion under the above conditions is about 95 to 98 percent and the selectivity of oxygen to chemicals is about 65 percent. While the selectivity of oxygen to chemicals in a hydrocarbon-rich system under vapor phase conditions is roughly the same as that for gas-liquid-phase operation, the difference in selectivity of butane on a carbon basis under the two different types of operations is quite noticeable. Thus, on a carbon basis, the selectivity of butane to chemicals in the process of my invention is about 95 percent, whereas, the average selectivity to chemicals on the same basis in the straight vapor-phase operation is about 40 percent.

From the foregoing description, it will be apparent that the process of my invention provides a hitherto unrecognized technique for effecting reactions between a gaseous reactant or reactants and one or more reactants in the liquid phase. Such procedure is particularly applicable to exothermic reactions wherein temperature control is a problem. Accordingly, inasmuch as the basic concept of my invention involves the provision of conditions which maintain one of the reactants in the vapor phase and one in the liquid phase, the latter being in substantial equilibrium with its vapors at the reaction temperature, it will be obvious to those skilled in the art that many reactions embodying gaseous- and liquid-phase reactants can be effected in accordance with said invention. Therefore, it is to be understood that the process of my invention is directed to those reactions which can occur within the temperature ranges specified herein and wherein one reacting component is in the liquid phase and the other is in the gas or vapor phase. When referring in the claims to reactions of this type, such reactions will be designated as gas-liquid-phase reactions.

I claim:

1. In a process for conducting gas-liquid-phase exothermic reactions between a gaseous reactant and an organic vaporizable liquid in a reaction zone, the improvement which comprises injecting said liquid into said zone in the form of a mist or droplets, said zone being at a reaction temperature ranging from the normal boiling point of said liquid up to a temperature below the critical temperature thereof, maintaining a pressure within said zone such that said liquid is at its boiling point at the reaction temperature, injecting said gaseous reactant into said zone to produce turbulence within said zone whereby said gaseous reactant is thoroughly mixed with said mist or liquid droplets, and controlling the temperature of said reaction zone by regulating both the rate of evaporation of liquid from said droplets and the rate at which said vaporizable liquid is fed to said reaction zone.

2. In a process for conducting gas-liquid-phase exothermic reactions between a gaseous reactant and a vaporizable liquid hydrocarbon in a reaction zone, the improvement which comprises injecting said liquid into said zone in the form of a mist or droplets, said zone being at a reaction temperature ranging from the normal boiling point of said liquid hydrocarbon to about the critical temperature thereof, maintaining a pressure within said zone such that said liquid hydrocarbon is at its boiling point at the reaction temperature, injecting said gaseous reactant into said zone to produce a turbulence within said zone whereby said gaseous reactant is thoroughly mixed with said mist or liquid hydrocarbon droplets, and controlling the temperature of said reaction zone by regulating both the rate of evaporation of liquid hydrocarbon from said droplets and the rate at which said vaporizable liquid hydrocarbon is fed to said reaction zone.

3. The process of claim 2 in which a catalyst for the reaction is supplied to the reaction zone.

4. In a process for conducting the oxidation of a vaporizable liquid hydrocarbon in a reaction zone, the improvement which comprises injecting said hydrocarbon into said zone in the form of a mist or droplets, said zone being at a reaction temperature ranging from the normal boiling point of said hydrocarbon up to a temperature below the critical temperature thereof, maintaining a pressure within said zone such that said hydrocarbon is at its boiling point at the reaction temperature, injecting an oxidizing gas into said zone to produce turbulence within said zone whereby said gaseous reactant is thoroughly mixed with said mist or liquid droplets, and controlling the temperature of said reaction zone by regulating both the rate of evaporation of liquid hydrocarbon from said droplets and the rate at which said hydrocarbon is fed to said reaction zone.

5. The process of claim 4 in which oxygen is the oxidizing gas, butane is the liquid hydrocarbon employed, and at least 5 to 15 percent of the butane introduced into said zone is withdrawn therefrom in the form of a liquid together with liquid reaction products.

6. The process of claim 5 in which the reaction temperature employed ranges from about 130° to about 150° C.

References Cited in the file of this patent

UNITED STATES PATENTS

| 2,009,663 | James | July 30, 1935 |
| 2,287,125 | Owen et al. | June 23, 1942 |
| 2,475,605 | Prutton et al. | July 12, 1949 |
| 2,626,277 | Merley et al. | Jan. 20, 1953 |
| 2,714,604 | Mitchell et al. | Aug. 2, 1955 |
| 2,722,553 | Mullen et al. | Nov. 1, 1955 |